United States Patent
Krishnakumar et al.

(10) Patent No.: US 10,871,875 B2
(45) Date of Patent: Dec. 22, 2020

(54) CURSOR IDENTIFICATION ON AN IHS DISPLAY

(71) Applicant: Dell Products, L.P., Round Rock, TX (US)

(72) Inventors: Karthikeyan Krishnakumar, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/422,694

(22) Filed: May 24, 2019

(65) Prior Publication Data
US 2020/0371664 A1    Nov. 26, 2020

(51) Int. Cl.
*G06F 3/0481* (2013.01)
*G06F 1/16* (2006.01)

(52) U.S. Cl.
CPC ........ *G06F 3/04812* (2013.01); *G06F 1/1616* (2013.01)

(58) Field of Classification Search
CPC ............................................ G06F 2203/04801
See application file for complete search history.

(56) References Cited

U.S. PATENT DOCUMENTS

| | | | | |
|---|---|---|---|---|
| 2002/0063740 | A1* | 5/2002 | Forlenza | G06F 3/0481 715/856 |
| 2002/0075230 | A1* | 6/2002 | Okuda | G06F 3/04892 345/157 |
| 2012/0272179 | A1* | 10/2012 | Stafford | G06F 3/038 715/781 |
| 2016/0313805 | A1* | 10/2016 | Vroom | G06F 3/038 |

OTHER PUBLICATIONS

Microsoft, "System Wake-up Events," May 20, 2018, 2 pages, retrieved Feb. 26, 2018, available at https://docs.microsoft.com/en-us/windows/desktop/power/system-wake-up-events.
Microsoft, "Mouse Class," System.Windows.Input, 9 pages, retrieved Feb. 26, 2018, available at https://docs.microsoft.com/en-us/dotnet/api/system.windows.input.mouse?view=netframework-4.7.2.

* cited by examiner

*Primary Examiner* — Robin J Mishler
(74) *Attorney, Agent, or Firm* — Fogarty LLP (57) ABSTRACT

An IHS (Information Handling Systems) supports pointing devices such as a mouse. To use a pointing device, a user must identify the displayed location of the cursor. Depending on factors such as the resolution and size of a display, a user may have difficulty in immediately locating a cursor. Embodiments support various cursor activation modes that allow a user to quickly locate the cursor. A cursor activation mode is initiated by an entry condition and is associated with a modified cursor appearance. Upon detecting an entry condition, the cursor appearance is modified. Upon detecting the exit condition, the appearance of the cursor is restored. The appearance of the cursor may be modified by changing the size and/or color of the cursor. The cursor may be positioned at a default screen location or a screen location corresponding to a direction of the user's gaze.

19 Claims, 5 Drawing Sheets

CURSOR IDENTIFICATION ON AN IHS DISPLAY

FIELD

This disclosure relates generally to Information Handling Systems (IHSs), and more specifically, to pointing devices supported by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may include a variety of I/O (input/output) capabilities by which users may provide inputs to an IHS any by which information may presented to users. Pointing devices, such as a mouse, are common input capabilities supported by many IHSs. Using a pointing device, a user may manipulate graphical controls and information displayed by an IHS. Movement of a pointing device corresponds to movement of a cursor or pointer that is displayed by the IHS. In order to begin using a pointing device, a user must first identify the location of the cursor that is being displayed by the IHS.

SUMMARY

In various embodiments, a method manages a cursor visible in one or more displays utilized by an Information Handling System (IHS). The method includes: configuring a cursor activation mode that is initiated by an entry condition, wherein the cursor activation mode is associated with a modified appearance of the cursor; detecting the entry condition; determining an exit condition associated with the cursor activation mode; modifying the appearance of the cursor upon detecting the entry condition; and upon detecting the exit condition, restoring the appearance of the cursor.

In additional method embodiments, the modification of the appearance of the cursor comprises enlarging a size of the cursor. In additional method embodiments, the modification of the appearance of the cursor comprises changing a color of the cursor. In additional embodiments, the method further includes determining a screen location for positioning the cursor on a first display of the one or more displays; and positioning the cursor at the determined screen location of the first display prior to modifying the appearance of the cursor. In additional method embodiments, the determined screen location on the first display for the position the cursor comprises a screen location corresponding to a direction of a gaze of a user of the IHS. In additional method embodiments, the exit condition comprises detecting whether a direction of a gaze of a user of the IHS corresponds to a location of the displayed cursor. In additional method embodiments, the exit condition comprises an expiration of a time duration. In additional method embodiments, the time duration is specified by a model trained based on prior durations required for a user to locate the cursor. In additional method embodiments, the exit condition comprises detecting a user selection made using a pointing device associated with the cursor, wherein the user selection initiates an operation supported by the IHS. In additional method embodiments, the entry condition comprises the IHS exiting an idle state.

In various additional embodiments, an Information Handling System (IHS) utilizes one or more displays and includes: one or more processors; and a memory device coupled to the one or more processors, the memory device storing computer-readable instructions that, upon execution by the one or more processors, cause the system to: configure a cursor activation mode that is initiated by an entry condition, wherein the cursor activation mode is associated with a modified appearance of a cursor; detect the entry condition; determine an exit condition associated with the cursor activation mode; upon detecting the entry condition, modify the appearance of the cursor; and upon detecting the exit condition, restoring the appearance of the cursor.

In additional IHS embodiments, the modification of the appearance of the cursor comprises at least one of: enlarging a size of the cursor and changing a color of the cursor. In additional IHS embodiments, the memory device storing additional computer-readable instructions that, upon execution by the one or more processors, further cause the system to: determine a screen location for positioning the cursor on a first display of the one or more displays; and position the cursor at the determined screen location of the first display prior to modifying the appearance of the cursor. In additional IHS embodiments, the determined screen location on the first display for the position the cursor comprises a screen location corresponding to a direction of a gaze of a user of the IHS. In additional IHS embodiments, the exit condition comprises detecting whether a direction of a gaze of a user of the IHS corresponds to a location of the displayed cursor. In additional IHS embodiments, the exit condition comprises an expiration of a time duration. In additional IHS embodiments, the entry condition comprises the IHS exiting an idle state.

In various additional embodiments, a computer-readable storage device of an Information Handling System (IHS) utilizing one or more displays, the storage device comprising program instructions stored thereon that, upon execution by a one or more processors, cause the one or more processors to: configure a cursor activation mode that is initiated by an entry condition, wherein the cursor activation mode is associated with a modified appearance of a cursor; detect the entry condition; determine an exit condition associated with the cursor activation mode; upon detecting the entry condition, modify the appearance of the cursor; and upon detecting the exit condition, restoring the appearance of the cursor.

In additional storage device embodiments, the modification of the appearance of the cursor comprises enlarging a size of the cursor. In additional storage device embodiments, computer-readable instructions further cause the processor to: determine a screen location for positioning the cursor on a first display of the one or more displays, wherein the screen location comprises a screen location corresponding to a direction of a gaze of a user of the IHS; and position the cursor at the determined screen location of the first display prior to modifying the appearance of the cursor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
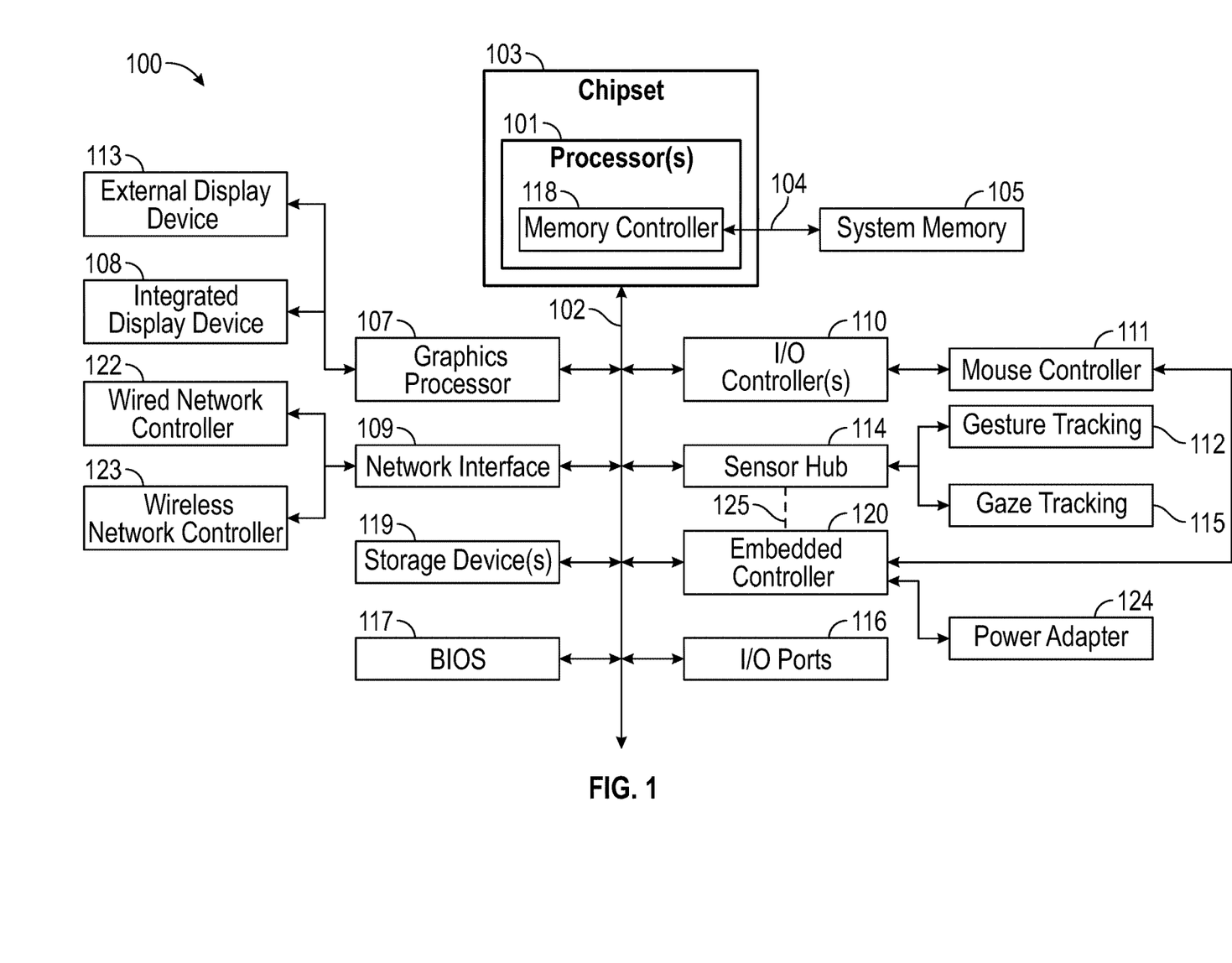
FIG. 1 is a block diagram depicting certain components of an IHS configured according to various embodiments for supporting cursor identification modes.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, an IHS may support pointing device capabilities, such as using a mouse, that allow a user to provide inputs to applications running on the IHS. However, in order to use a pointing device, a user must first identify the location of the displayed cursor or pointer that is associated with the pointing device. Depending on factors such as the display resolution and the size of the display being used, a user may have difficulty in identifying the location of a displayed cursor. Such difficulties may be pronounced upon attempting to resume use of an IHS after a period of inactivity, such as after the IHS has entered an idle or sleep state that is supported by the IHS. These difficulties may be further pronounced in scenarios where an IHS utilizes one or more external display devices, thus providing multiple different screens where a cursor may be located. Accordingly, embodiments support various cursor identification modes that allow a user to more quickly identify the current location of a displayed cursor.

FIG. 1 is a block diagram illustrating certain components of an IHS 100 configured according to certain embodiments for supporting cursor identification modes. In various embodiments, IHS 100 may include an embedded controller 120, mouse controller 111 and a sensor hub 114 that may each execute program instructions that cause each of these components to perform certain of the operations disclosed herein. In certain embodiments, IHS 100 may be configured as a member of an enterprise network by which a variety of computing services may be provided to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as W-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100.

In certain embodiments, chipset 103 may utilize one or more I/O controllers 110 that may each support one or more I/O devices. In particular, I/O controllers 110 may include a mouse controller 111 that supports the use of a mouse or other pointing device, such as a trackpad or touchpad. As described in additional detail with regard to the below embodiments, mouse controller 111 may be configured to support various cursor activation modes that assist the user in locating the displayed location of a cursor or pointer associated with a pointing device. In certain embodiments, the mouse controller 111 may be configured to support cursor activation modes by specifying various sizes, colors and behaviors for the display of a cursor during the activation mode. In various embodiments, I/O controller 110 may provide access to one or more additional user I/O devices such as a keyboard, touchscreen, microphone, speakers, camera and other input and output devices that may be coupled to IHS 100. Each of the supported user I/O devices may interface with the I/O controller 110 through wired or wireless connections.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state.

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to an external I/O port 116 of the IHS 100. As described in additional detail with regard to FIGS. 2A-C, in certain configurations, an IHS 100 may utilize multiple external displays in an extended desktop configuration. When configured in this manner, a user may experience difficulty in immediately locating a cursor associated with pointing devices supported by mouse controller 111 since the cursor may be located in any of the supported external displays.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as by a secure processor, in order to establish a hardware root of trust in the trusted component that may then be utilized to support certain secure operations of IHS 100, such as user authentication.

As illustrated, certain IHS 100 embodiments may utilize a sensor hub 114 capable of tracking various aspect of the user of IHS 100. For instance, sensor hub 114 may access cameras and other optical sensors in order to implement gaze tracking 115 capabilities by which the direction of the user's gaze may be monitored. The gaze tracking 115 implemented by sensor hub 114 may operate based on tracking features of a user's eyes, such as the user's pupils, and may additionally or alternatively based on tracking features of the face and head. In some embodiments, sensor hub 114 capabilities, such as data captured by optical, infrared and sonar sensors, may provide support for gesture tracking 112 capabilities that monitor for user signals such as hand gestures that correspond to commands by the user. In some embodiments, theses sensor hub 114 capabilities may further support xR (virtual, augmented, mixed reality) sessions hosted by the IHS 100. In some embodiments, sensor hub 114 may utilize the various sensor for collecting environmental information, such as ambient lighting conditions.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as sensors used for tracking the gaze and gestures of a user of IHS 100. Sensor hub 114 may collect and processes data from such sensors using data fusion techniques in order to determine gaze and gesture determinations.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus the operating system functions of IHS 100. Firmware instructions utilized by embedded controller 120 may be used to operate a secure execution environment that may include operations for supporting various core functions of IHS 100, such as power management, docking and management of the operational states (e.g., wake, sleep, hibernation, etc.) of IHS 100. For instance, embedded controller 120 may implement operations for interfacing with a power adapter 124 configured for managing power operations of IHS 100, such as operations for managing the charging and discharging of the internal batteries of the IHS 100. As illustrated, embedded controller 120 may utilize an out-of-band signaling pathway 125 that supports communications outside of the operating system and thus during low-power operating system states.

In certain embodiments, via this out-of-band signal pathway 125, embedded controller 120 may receive gaze tracking information from sensor hub 114. Based on the gaze direction information collected by sensor hub 114, embedded controller 120 may determine the screen location on the one or more displays 108, 113 at which the user's gaze is directed. In certain configurations, embedded controller 120 may determine a precise set of screen coordinates at which the user's gaze is directed. However, as described in additional detail with regard to FIGS. 2A-C, a large variety of physical configurations of external displays may be coupled to an IHS. Accordingly, in certain configurations, embedded controller 120 may utilize the gaze information provided by sensor hub 114 in order to identify the specific display device at which the user's gaze is directed, without attempting to make a more accurate determination of any specific screen coordinates at which the user's gaze is directed.

In addition, the operations of the secure execution environment of embedded controller 120 may include operations for implementing aspects of the cursor activation modes described herein. For instance, firmware of embedded controller 120 may include instructions for interfacing with mouse controller 111 in order to implement cursor activation modes. For instance, upon detecting a wake condition in which power has been restored to internal and external displays 108, 113, embedded controller 120 may signal mouse controller 111 to initiate a cursor activation mode. During such wake conditions, a user may be unable to immediately locate the cursor. The cursor activation mode implemented by mouse controller 111 may be a period during which the appearance and/or behavior of the cursor is modified in a manner that improves the ability of the user to locate the cursor.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
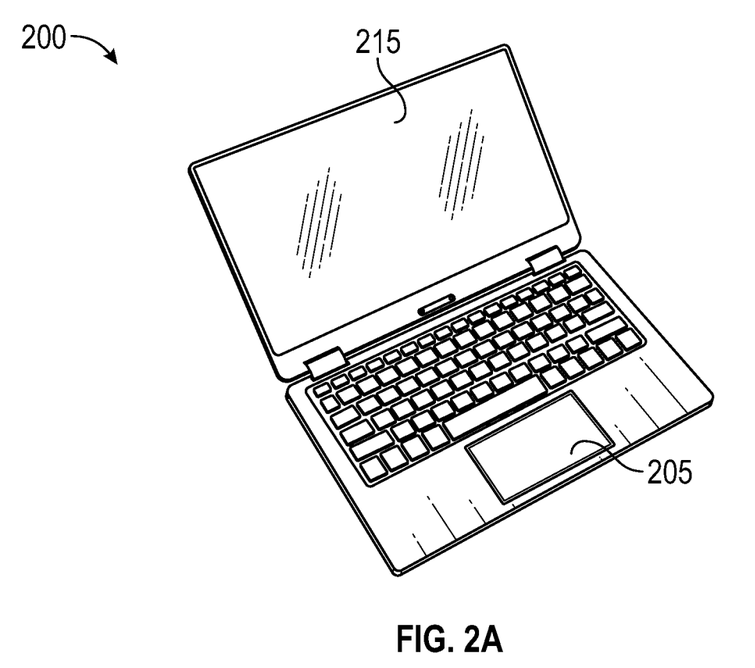
FIG. 2A is an illustration of a laptop IHS that utilizes a trackpad for receiving mouse inputs.

FIG. 2A is an illustration of a laptop IHS 200 that utilizes a trackpad 205 for receiving user inputs. More specifically, via inputs to the trackpad 205, the user may move a cursor or other pointer that is shown in the display 215 of the laptop. In addition, inputs to the trackpad 205 may allow the user to manipulate graphical objects that are visible in the display 215, such as graphical objects and interfaces displayed via the operating system of the IHS 200. In certain instances, an IHS 200 such as laptop 200 of FIG. 2A may be configured to enter a low-power state upon a period of inactivity or in response to a command from a user. In such low-power operating states, the display 215 of the IHS 200 may be turned off. Upon exiting such low-power operating states, power to the display 215 may be restored and, in turn, the applications and graphics being displayed by the operating system may also be restored. However, in order to begin utilizing trackpad 205 to provide inputs to the IHS 200, a user must locate the cursor on display 215. As described, immediately locating the cursor on display 215 may be difficult in scenarios where high-resolution display settings are being utilized. This difficulty may be even greater depending on the content that is currently being presented in display 215.

Figure 2B:
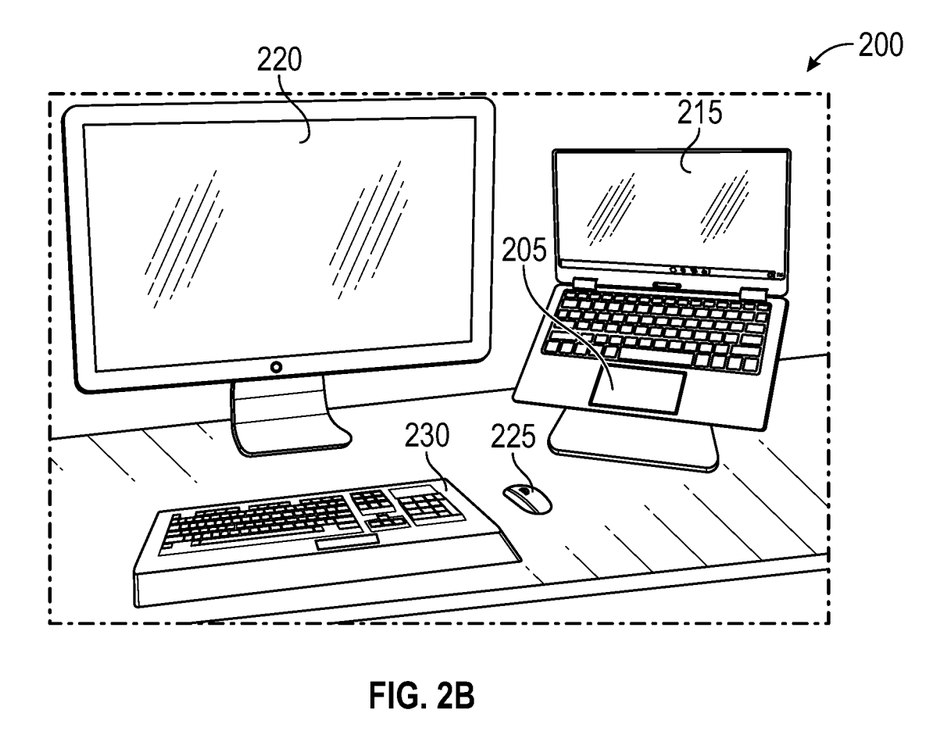
FIG. 2B is an illustration of a laptop IHS configured for use with an external display and an external mouse.

FIG. 2B is an illustration of the laptop IHS 200 of FIG. 2A, now configured for use with an external display 220 and an external mouse 225. In the configuration of FIG. 2B, two sets of inputs are supported. A user may provide key entry inputs via an integrated keyboard of the laptop IHS 200 or via an external keyboard 230. Similarly, pointing device inputs may be provided via the integrated trackpad 205 or via an external mouse 225. In certain configurations, the integrated display 215 of the IHS 200 and the external display 220 may be utilized as a single display (i.e., an extended desktop configuration) in which the user may utilize either of the pointing device inputs 205 or 225 in controlling the cursor, where such cursor movements may be between the two displays 215 and 220. In such configurations, the user face difficulty in immediately locating the cursor since the cursor may be located on either of the two displays 215 or 220.

Figure 2C:
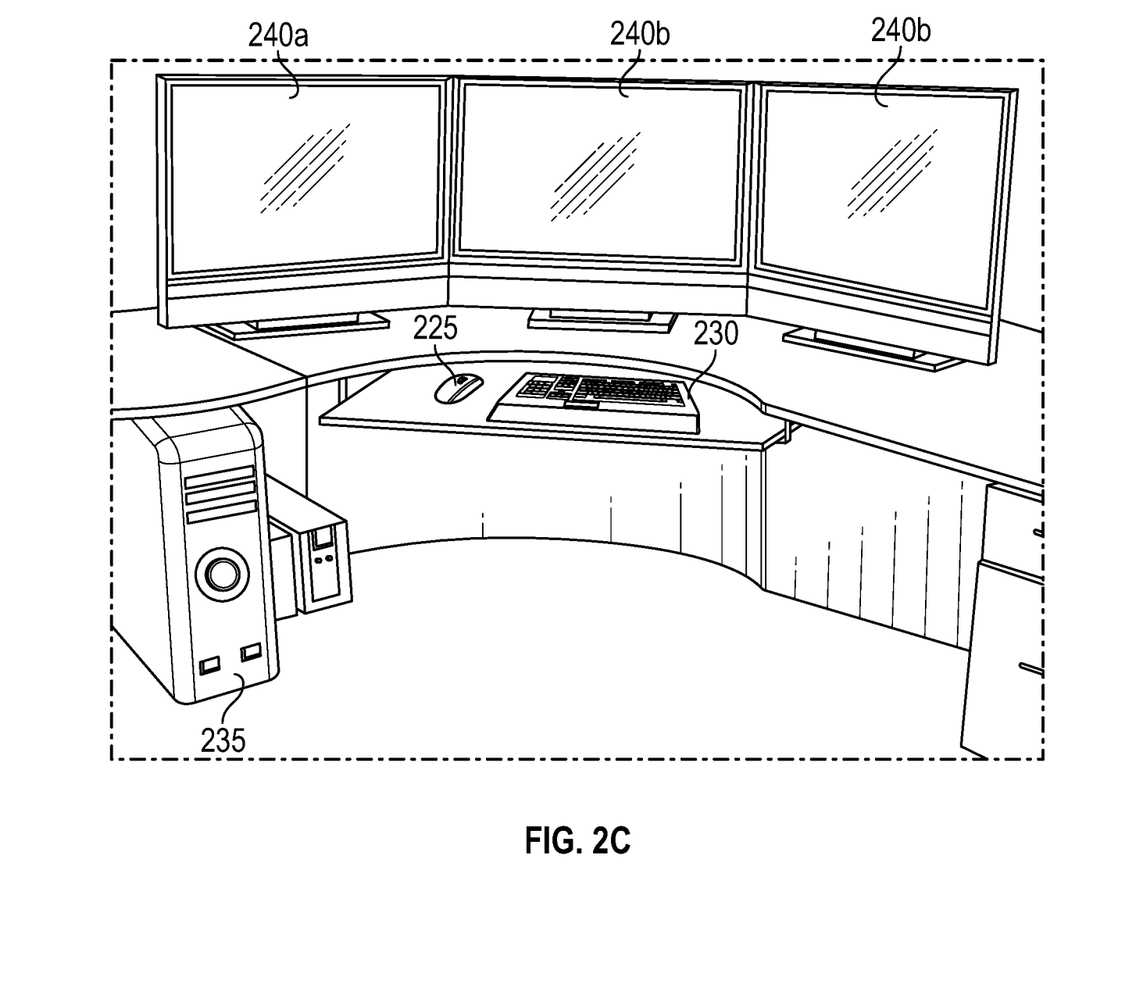
FIG. 2C is an illustration of a desktop IHS configured for use with multiple displays and a mouse.

FIG. 2C is an illustration of a desktop IHS 235 configured for use with multiple displays 240*a-c* and a mouse 225. As a desktop IHS 235, external user input devices, such as the keyboard 230 and mouse 225, are utilized. The desktop IHS 235 may include capabilities for the display of extended operating system desktops that span multiple displays 240*a-c*. A laptop IHS, such as laptop 200, may be similarly configured for use of multiple external displays, such as via a docking station. In the configuration of FIG. 2C, three displays 240*a-c* are utilized. In other configurations, any number of displays may be utilized in a similar manner. In scenarios where the displays 240*a-c* are used as an extended desktop, a user may have difficulty immediately locating the cursor since it may be located on any of the three displays 240*a-c*. This difficulty is compounded as the number of displays is increased and may be further compounded when utilizing high-resolution display settings.

Figure 3:
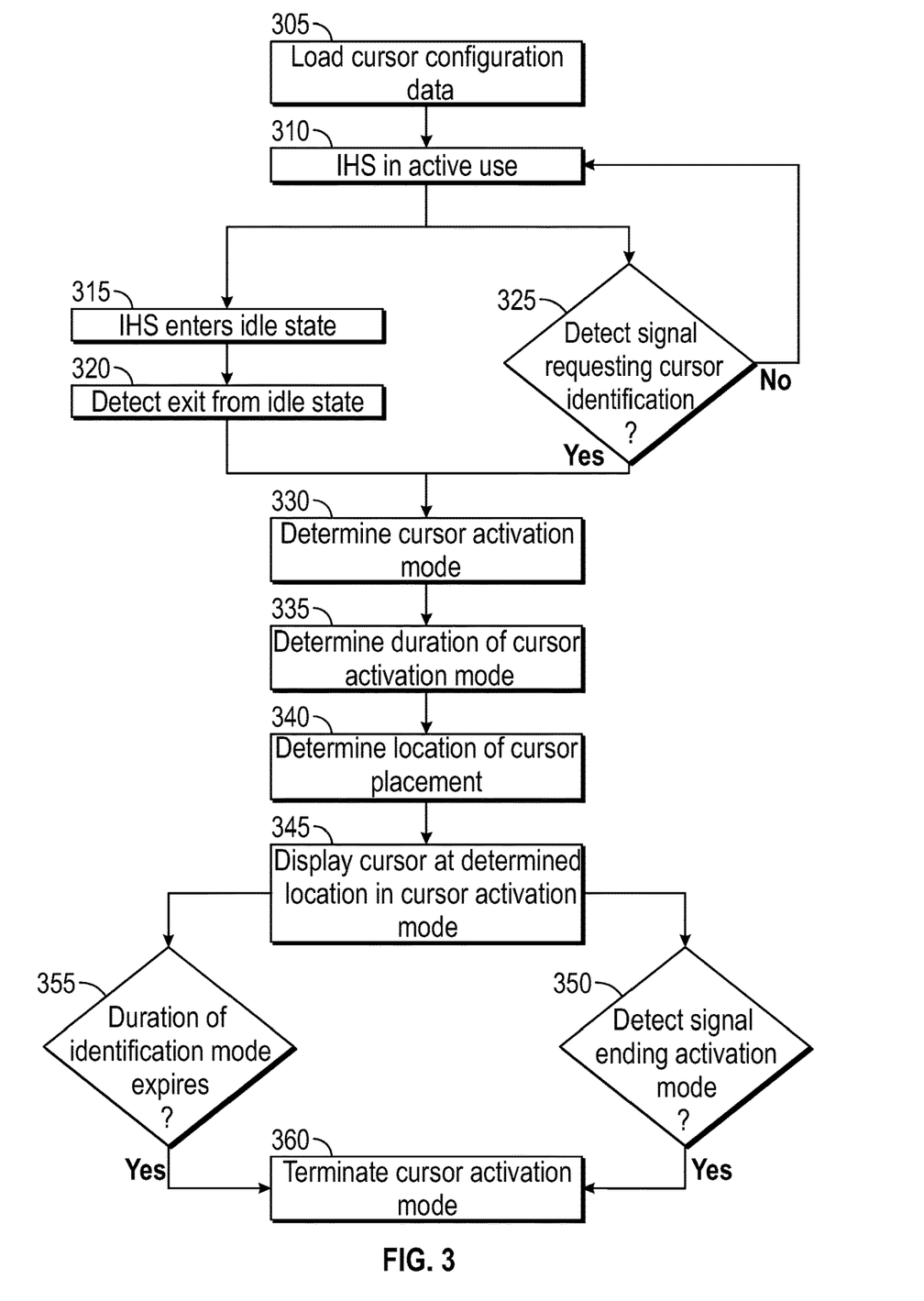
FIG. 3 is a flowchart illustrating certain step of a method according to various embodiment for supporting cursor identification modes.

FIG. 3 is a flowchart illustrating certain step of a method according to various embodiment for supporting cursor identification modes. In certain embodiments, methods may begin at block 305 with the loading of configuration data for the cursor activation modes that are supported by an IHS, such as IHS 100 of FIG. 1. As described in greater detail below, various aspects of the cursor activation modes may be configured. For instance, for activation modes that terminate after a predefined duration, the length of such durations may be configured. Additionally, different cursor activation modes may employ different techniques for drawing the user's attention to the displayed cursor. Accordingly, configuration data may specify a particular cursor activation mode, utilizing particular modifications to the appearance and/or behavior of the cursor, that is preferred by a user.

In certain embodiments, the configuration data loaded at block 305 may include exit condition configurations for activation modes that have been determined based on machine learning of typical user behavior. For instance, machine learning may be used to generate a model specifying the time a user typically takes to locate the cursor. Such models may account for factors such as the number of displays being utilized, the resolution settings of the utilized displays, ambient lighting conditions and the duration of the last idle state. As described with regard to FIG. 1, an IHS according to embodiments may utilize a sensor hub capable of measuring ambient lighting conditions and an embedded controller capable of providing information pertaining to operation states, such as idles states, of an IHS. Using such user-specific models, the duration associated with a cursor activation mode may be specified and this duration may be adapted for variable conditions, such as ambient lighting and idle state duration.

At block 310, active use of the IHS may proceed. In certain scenarios, active use of an IHS may proceed for prolonged periods, such as in watching streaming video or in a gaming session. In other scenarios, active use of an IHS may proceed more intermittently, such as a user browsing the web or drafting a document in a word processing application. However, after some period of detected inactivity, at block 315, the IHS may enter an idle state. In some embodiments, the idle state may initiate certain energy conservation procedures that result in the IHS been configured in a low-power state. In certain instances, when in an idle state, the internal and/or external displays of the IHS may be turned off. In some instances, the IHS itself, including the processors and thus the operating system, may also be placed in a low-power state after a prolonged period of inactivity.

While in an idle state, at block 320, various events may signal the resumption of full-power activities. For instance, while in a low-power sleep state, the detection of a user input, such as movement of a mouse or a keyboard input, may trigger the IHS to exit the sleep state. In other instances, the user may issue a command for the IHS to exit an idle state through various other user inputs, such as voice command or a hand gesture. As described, when exiting such low-power operating states and resuming output to the display(s) of the IHS, a user may have difficulty immediately locating the cursor in the display(s). Accordingly, at block 330, the IHS may determine an activation mode for the displayed cursor, thus supporting the ability to immediately draw the user's attention to the location of the displayed cursor.

In certain embodiments, such activation modes for a displayed cursor may be initiated based on a user signal. In the illustrated embodiment, at block 325, the IHS detects any such user signals indicating a request for a cursor activation mode. As described, active use of an IHS may proceed relatively intermittently. In such scenarios, the user may be referencing sources of information external to the IHS, such as a paper document, and may be intermittently moving away from the IHS. Accordingly, when resuming use of the IHS, a user may experience difficulty in immediately locating the cursor. Through the signaling supported by the described embodiments, a user facing such difficulty may active a cursor activation mode that is configured to operate according to the user's preferences loaded at block 305.

Embodiments may the support various forms of signaling by which a user may request initiation of a cursor activation mode. For instance, a user may signal a cursor activation mode through a keyboard input, such as a defined function key. A user may also signal the cursor activation mode through a particular mouse movement, such as through rapid back-and-forth movements of the mouse. In other embodiments, voice commands may be used to initiate a cursor activation mode. Certain embodiments may detect hand gestures made by the user in triggering a cursor activation mode.

In certain embodiments, a user may signal a cursor activation mode through a keyboard input. For instance, when resuming from an idle state, embodiments may be configured to respond to a specific keyboard entry (e.g., pressing the CTRL key) by initiating a cursor activation mode. In certain of such embodiments, an exit condition may be triggered upon the user releasing the key, in which case the cursor activation mode lasts as long as the user keeps the key depressed. In some embodiments, a keyboard entry may serve as an entry condition for a cursor activation mode and the exit condition may be configured as a specified duration after the user releases the key, or after the user keypress is first detected. In certain embodiments, a mouse or other pointing device may also generate such key input events that serve as entry conditions and exit condition. For instance, a wireless mouse controller, such as described with regard to FIG. 1, may be configured to inject keyboard inputs corresponding to activation mode entry and exit conditions into the event stream that is transmitted by the mouse controller to the IHS. For instance, in response to a button press on a mouse, a CTRL keypress event may be generated by the mouse controller and transmitted to the system. In this manner, identical cursor activation mode operations may be utilized using keyboard and pointing device inputs.

Whether the cursor activation mode is initiated based upon a user signal or based upon on exiting an idle state, at block 330, a specific cursor activation mode is selected and triggered. Various different cursor activation modes may be supported and may be selected at block 330 based on the configuration preferences loaded at step 305. In one activation mode, the cursor may be displayed considerably larger than normal. In another activation mode, the cursor may be displayed in a different color than normal. In another mode, the cursor may alternate between colors or otherwise give the appearance of flashing. In another mode, the cursor may be moved rapidly about within a small bounded area, giving the appearance of the pointer shaking or vibrating. In certain activation modes, some or all of these modes may be combined. For instance, an activation mode may be supported in which the cursor is displayed in increased size and also flashes between alternating colors. As described in additional detail with regard to FIG. 4, certain embodiments may support activation modes that utilize eye gaze tracking.

If such activation modes are available, these eye gaze tracking activation modes may be selected for use at block 330.

With the cursor activation mode selected, at block 335, the duration of the selected activation mode may be determined. In certain embodiments, such durations may be determined based on the configuration preferences loaded at block 305. For instance, the duration of an activation mode may be a specific time duration, such as two seconds, specified by user preference setting. In other embodiments, the duration of the cursor activation mode may be based on detecting a signal or condition. For instance, the duration of an activation mode may be based on detecting a user signal, such as a hand gesture. In other configurations, an activation mode may terminate in response to exit conditions such as detecting use of the mouse to perform an operation supported by the operating system or by an application running within the operating system. For instance, IHS operations that may be defined as exit conditions for a cursor activation mode may include use of a mouse or other pointing device to launch an application, open a file, navigate a file system, select a menu item, select text, navigate a hyperlink or make other graphical user interface selections. As described with regard to FIG. 4, the duration of a cursor activation mode may additionally or alternatively be based on detecting, based on eye gaze tracking, a exit condition in which the user has successfully located the displayed location of the mouse pointer.

At block 340, the location to display the cursor at the initiation of the activation mode may be determined. As with the other described configurations, such placement information may be based on user preferences loaded at block 305. In certain embodiments, a cursor may be placed in the default location during activation mode, such as the center of the screen of the main display in use by an IHS. In other embodiments, a cursor may remain at its existing location. As described with regard to FIG. 4, in certain embodiments, the location of the cursor at the initiation of an activation mode may be determined based on eye gaze tracking. At block 345, the cursor is displayed at the determined location with the determined activation mode initiated. Various aspects of the appearance of the cursor may be modified during the activation mode. For instance, in one activation mode, the location of the cursor may be maintained and may be displayed using a bright color and of a larger size than normal. In other activation modes, the color of the cursor may be alternated to give the appearance of the cursor flashing or blinking. Other activation modes may include movement by the cursor. With the activation mode initiated, the user is able to locate the cursor and may continue to use the mouse or other pointing device while still operating according to activation mode.

While the activation mode is operational and the appearance of the cursor remains in a modified state, an exit condition associated with the cursor activation mode may be detected. In certain instances, at block 355, the expiration of a duration associated with an activation mode may be detected. As described, such a duration may be determined according to user preferences. In other instances, at block 350, user signal indicating a command to terminate the activation mode may be detected. For instance, a user may be provided the capability to terminate an activation mode using inputs such as a voice command, hand signal, keyboard entry or a mouse click. Upon reaching the end of the activation mode duration, receiving a user signal or detecting another exit condition, at block 360 the activation mode terminates and the mouse appearance and behavior revert to regular use.

Figure 4:
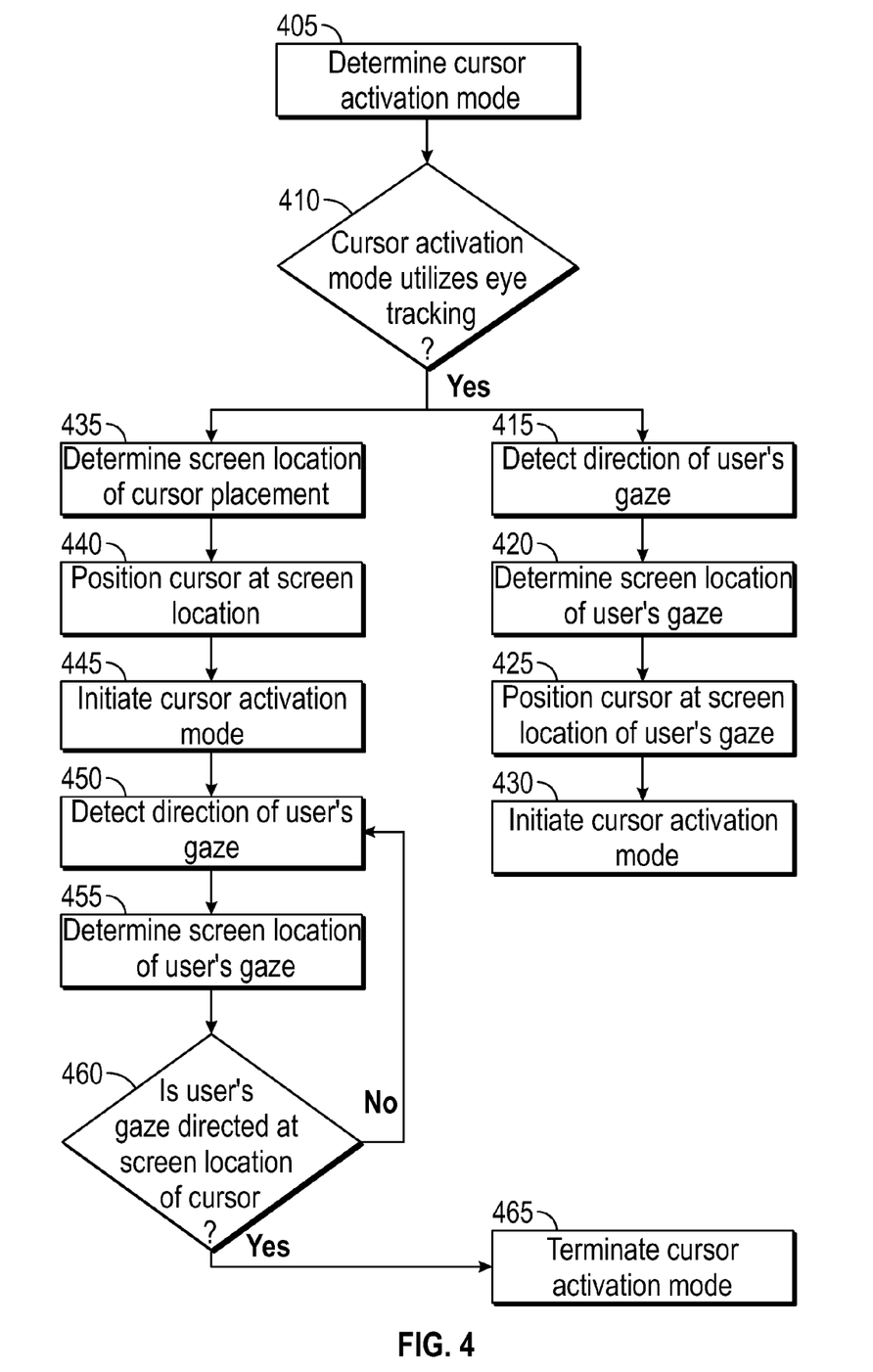
FIG. 4 is a flowchart illustrating certain step of a method according to various embodiment for supporting cursor identification modes that utilize tracking of a user's eye gaze.

FIG. 4 is a flowchart illustrating certain step of a method according to various embodiment for supporting cursor identification modes that utilize tracking of a user's eye gaze. In the embodiment of FIG. 4, eye gaze tracking may be utilized to determine whether a user has located the displayed cursor and/or to position the cursor upon initiating an activation mode. In the embodiment of FIG. 4, the described method commences at block 405 with the determination of the activation mode to be initiated. As with the embodiment of FIG. 3, the activation mode may be initiated upon an entry condition, such as detecting the IHS exiting an idle state or based upon a user signal. Also as described with regard to FIG. 3, the activation mode may be selected and configured based on settings applicable to a particular user.

As described with regard to FIG. 1, certain IHSs may include capabilities for tracking the direction of the gaze of a user. For an IHS supporting such eye gaze tracking, upon determining the cursor activation mode to be initiated, at block 410, the IHS determines whether the selected activation mode utilizes eye gaze tracking. FIG. 4 illustrates two possible cursor activation modes that may utilize eye gaze tracking. In one of such activation modes, at block 415, the direction of the user's gaze is determined, such as using the sensor hub capabilities of the IHS 100 of FIG. 1. At step 420, the screen location corresponding to the direction of the user's gaze is determined. As described, in certain configurations, an IHS may utilize different combinations of integrated and external displays. In multi-display configurations, certain embodiments may determine only the specific display that is the target of the user's gaze, while other embodiments may determine a specific location on the screen that is the target of the user's gaze.

At block 425, the cursor may be positioned at the determined screen location corresponding to the user's gaze. If a specific screen location has been determined as the target of the user's gaze, the cursor may be placed at this specific screen location. If the direction of the user's gaze has instead been identified as directed towards a display device rather than at a particular location on a screen, the cursor may be positioned at a default location on the monitor screen that is the focus of the user's gaze. With the location for the cursor determined, at block 430, a cursor activation mode is initiated and the appearance and/or behavior of the cursor is modified according to the parameters of the activation mode. As with the embodiment of FIG. 3, a cursor activation mode may continue in operation until expiration of a predefined duration or until a signal is received from the user.

As illustrated in FIG. 4, other activation modes may utilize eye gaze tracking. For instance, eye gaze tracking may be used to determine whether the user has located the displayed cursor. Such an activation mode may begin, at block 435, by determining the location for placement of the cursor. In certain configurations, the cursor may be positioned at a default screen location. In other activation mode configurations, the cursor's current location may be left unchanged. At block 440, the cursor is positioned at this screen location and, at block 445, and the cursor activation mode is initiated such that the appearance and/or behavior of the cursor is modified. As described, in various cursor activation modes, the size, color, movement or other aspects of the cursor may be modified in a manner that improves the ability of the user to locate the displayed cursor.

Upon initiating the cursor activation mode, at block 450, the direction of the user's gaze may be determined, such as using the sensor hub capabilities of IHS 100 described with regard to FIG. 1. At block 455, the screen location corresponding to the direction of the user's gaze is determined. In certain instances, the direction of the user's gaze may be determined to correspond to a specific screen location on an integrated or an external display utilized by an IHS. In other instances during which multiple displays are being utilized, such as illustrated in FIG. 2C, the direction of the user's gaze may instead be determined to correspond only to a particular display.

At block 460, the screen location corresponding to the direction of the user's gaze is compared against the displayed location of the cursor. If the user's gaze is not directed at the displayed location of the cursor, thus indicating the user has yet to locate the displayed cursor, monitoring of the direction of the user's gaze continues at block 450. However, if the user's gaze is determined to be directed at the displayed location of the cursor, at block 465, the cursor activation mode is terminated based on the indication that the user has located the displayed location of the cursor. In scenarios where the user's eye gaze is determined to correspond only to a particular display of a multi-display configuration and not to any specific screen coordinates, the user's eye gaze may be determined to be directed at the cursor as long as the user's eye gaze is directed at the specific display in which the cursor is visible.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing a cursor visible in one or more displays utilized by an Information Handling System (IHS), the method comprising:
   configuring a cursor activation mode that is initiated by an entry condition and ended by an exit condition, wherein the cursor activation mode is associated with a modified appearance of the cursor;
   detecting the entry condition;
   determining the exit condition associated with the cursor activation mode, wherein the exit condition comprises an expiration of a time duration specified by a model trained based on prior durations required for a user to locate the cursor during prior instances of the cursor activation mode;
   modifying the appearance of the cursor upon detecting the entry condition; and
   upon detecting the exit condition, restoring the appearance of the cursor.

2. The method of claim 1, wherein the modification of the appearance of the cursor comprises enlarging a size of the cursor.

3. The method of claim 1, wherein the modification of the appearance of the cursor comprises changing a color of the cursor.

4. The method of claim 1, further comprising:
   determining a screen location for positioning the cursor on a first display of the one or more displays; and
   positioning the cursor at the determined screen location of the first display prior to modifying the appearance of the cursor.

5. The method of claim 4, wherein the determined screen location on the first display for the position the cursor comprises a screen location corresponding to a direction of a gaze of a user of the IHS.

6. The method of claim 1, wherein the exit condition comprises detecting whether a direction of a gaze of a user of the IHS corresponds to a location of the displayed cursor.

7. The method of claim 1, wherein the model specifying the time duration is further trained based on a number of the one or more displays utilized by the IHS.

8. The method of claim 1, wherein the model specifying the time duration is further trained based on a resolution of the one or more displays used utilized by the IHS.

9. The method of claim 1, wherein the model specifying the time duration is further trained based on a level of ambient lighting.

10. The method of claim 1, wherein the entry condition comprises the IHS exiting an idle state.

11. The method of claim 1, wherein the entry condition comprises a keyboard input.

12. An Information Handling System (IHS) utilizing one or more displays comprising a first display and a second display, comprising:
one or more processors; and
a memory device coupled to the one or more processors, the memory device storing computer-readable instructions that, upon execution by the one or more processors, cause the system to:
configure a cursor activation mode that is initiated by an entry condition and ended by an exit condition, wherein the cursor activation mode is associated with a modified appearance and a modified location of a cursor;
detect the entry condition;
determine the exit condition associated with the cursor activation mode, wherein the exit condition comprises an expiration of a time duration specified by a model trained based on prior durations required for a user to locate the cursor during prior instances of the cursor activation mode;
upon detecting the entry condition:
determine the cursor is currently being displayed in the first display,
determine a gaze of user of the IHS is directed at the second display,
modify the location of the cursor by repositioning the cursor from the first display to a screen location on the second display, and
modify the appearance of the cursor at the screen location on the second display; and
upon detecting the exit condition, restoring the appearance of the cursor.

13. The IHS of claim 12, wherein the modification of the appearance of the cursor comprises at least one of: enlarging a size of the cursor and changing a color of the cursor.

14. The IHS of claim 12, wherein the cursor is repositioned to a predefined screen location of the second display without regard to a specific screen location of the second display that corresponds to a direction of the user's gaze.

15. The IHS of claim 12, wherein the screen location on the first second display for the repositioning of the cursor comprises a screen location on the second display corresponding to a direction of a gaze of a user of the IHS.

16. The IHS of claim 12, wherein the entry condition comprises the IHS exiting an idle state.

17. A computer-readable storage device of an Information Handling System (IHS) utilizing one or more displays, the storage device comprising program instructions stored thereon that, upon execution by a one or more processors, cause the one or more processors to:
configure a cursor activation mode that is initiated by an entry condition, wherein the cursor activation mode is associated with a modified appearance of a cursor;
detect the entry condition comprising the IHS exiting an idle state;
determine an exit condition associated with the cursor activation mode, wherein the exit condition comprises an expiration of a time duration specified by a model trained based on prior durations required for a user to locate the cursor during prior instances of the cursor activation mode;
upon detecting the entry condition, modify the appearance of the cursor; and
upon detecting the exit condition, restoring the appearance of the cursor.

18. The storage device of claim 17, wherein the modification of the appearance of the cursor comprises at least one of: enlarging a size of the cursor and changing a color of the cursor.

19. The storage device of claim 17, wherein the idle state is a low-power mode of the IHS in which the one or more displays are turned off.

* * * * *

UNITED STATES PATENT AND TRADEMARK OFFICE
CERTIFICATE OF CORRECTION

PATENT NO. : 10,871,875 B2  
APPLICATION NO. : 16/422694  
DATED : December 22, 2020  
INVENTOR(S) : Krishnakumar et al.

Page 1 of 1

It is certified that error appears in the above-identified patent and that said Letters Patent is hereby corrected as shown below:

In the Claims

In Column 16, Line 4, Claim 15, delete "the first second display" and insert -- the second display -- therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*